United States Patent
Roev et al.

(10) Patent No.: US 7,902,111 B2
(45) Date of Patent: Mar. 8, 2011

(54) SUPPORTED CATALYST FOR FUEL CELL, METHOD OF PREPARING THE SAME, ELECTRODE FOR FUEL CELL INCLUDING THE SUPPORTED CATALYST, AND FUEL CELL INCLUDING THE ELECTRODE

(75) Inventors: Victor Roev, Yongin-si (KR); Sang-hyuk Suh, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 465 days.

(21) Appl. No.: 11/605,441

(22) Filed: Nov. 29, 2006

(65) Prior Publication Data

US 2007/0184972 A1    Aug. 9, 2007

(30) Foreign Application Priority Data

Feb. 7, 2006    (KR) .................. 10-2006-0011832

(51) Int. Cl.
| | |
|---|---|
| H01M 4/88 | (2006.01) |
| H01M 4/02 | (2006.01) |
| H01M 4/36 | (2006.01) |
| H01M 4/94 | (2006.01) |
| H01M 4/90 | (2006.01) |
| B01J 21/18 | (2006.01) |
| B01J 23/00 | (2006.01) |
| B01J 23/40 | (2006.01) |
| B01J 23/74 | (2006.01) |

(52) U.S. Cl. ................ 502/185; 502/101; 502/180; 502/182; 429/523; 429/524; 429/525; 429/526; 429/527

(58) Field of Classification Search ............. 502/101, 502/180, 182, 185; 429/40–44, 523–527
See application file for complete search history.

(56) References Cited

U.S. PATENT DOCUMENTS 6,007,934 A    12/1999    Auer et al.

(Continued)

FOREIGN PATENT DOCUMENTS

CN    1423355    6/2003

(Continued)

OTHER PUBLICATIONS

Certificate of Patent No. ZL 200610163627 issued in corresponding Chinese Patent Application No. CN 100595953C on Mar. 24, 2010.

*Primary Examiner* — Patricia L Hailey
(74) *Attorney, Agent, or Firm* — Lee & Morse, P.C.

(57) ABSTRACT

A supported catalyst for a fuel cell, a method of preparing the same, an electrode for a fuel cell including the supported catalyst, and a fuel cell including the electrode. The supported catalyst for the fuel cell includes a graphite based catalyst carrier; a first catalyst metal particle adsorbed on the surface of the graphite based catalyst carrier, wherein the amount of the first catalyst metal particle is at least 30 wt % based on the supported catalyst; and a second catalyst metal particle impregnated on the surface of the first catalyst metal particle. The supported catalyst for a fuel cell uses a graphite based catalyst carrier to increase durability of the fuel cell. Accordingly, the supported catalyst for the fuel cell provides superior energy density and fuel efficiency, by minimizing the loss of a metal catalyst impregnated in the graphite based catalyst carrier and regulating the amount of the impregnated metal catalyst.

28 Claims, 5 Drawing Sheets

U.S. PATENT DOCUMENTS

| | | | |
|---|---|---|---|
| 6,066,410 A * | 5/2000 | Auer et al. | 429/40 |
| 6,306,543 B1 | 10/2001 | Vinson | |
| 6,548,445 B1 * | 4/2003 | Buysch et al. | 502/230 |
| 6,551,960 B1 | 4/2003 | Laine et al. | |
| 6,686,308 B2 * | 2/2004 | Mao et al. | 502/180 |
| 6,749,892 B2 * | 6/2004 | Chang | 427/115 |
| 6,787,500 B2 | 9/2004 | Ito et al. | |
| 6,797,667 B2 * | 9/2004 | Ruth et al. | 502/182 |
| 6,861,387 B2 * | 3/2005 | Ruth et al. | 502/184 |
| 7,022,642 B2 | 4/2006 | Yamamoto | |
| 7,037,873 B2 * | 5/2006 | Kato | 502/180 |
| 7,053,021 B1 | 5/2006 | Zhong et al. | |
| 7,150,866 B2 * | 12/2006 | Wieland et al. | 423/652 |
| 7,335,245 B2 | 2/2008 | He et al. | |
| 2002/0009626 A1 * | 1/2002 | Terazono et al. | 429/30 |
| 2005/0142428 A1 | 6/2005 | Daimon et al. | |
| 2007/0059585 A1 * | 3/2007 | Yoo et al. | 429/44 |

FOREIGN PATENT DOCUMENTS

| | | |
|---|---|---|
| CN | 1661836 | 8/2005 |
| JP | 09-027327 A | 1/1997 |
| JP | 10-334925 A | 12/1998 |
| JP | 2002-231255 A | 8/2002 |
| JP | 2002-289208 A | 10/2002 |
| JP | 2003-080077 A | 3/2003 |
| JP | 2004-139789 | 5/2004 |
| JP | 2005-5257 | 1/2005 |
| JP | 2005-034836 A | 2/2005 |
| JP | 2005-515063 T | 5/2005 |
| JP | 2005-324156 A | 11/2005 |
| JP | 2006-012682 A | 1/2006 |
| JP | 2006-31978 | 2/2006 |
| WO | WO 2005/118184 A | 12/2005 |

* cited by examiner

SUPPORTED CATALYST FOR FUEL CELL, METHOD OF PREPARING THE SAME, ELECTRODE FOR FUEL CELL INCLUDING THE SUPPORTED CATALYST, AND FUEL CELL INCLUDING THE ELECTRODE

CROSS-REFERENCE TO RELATED APPLICATION

This application claims the benefit of Korean Patent Application No. 2006-11832, filed on Feb. 7, 2006, in the Korean Intellectual Property Office, the disclosure of which is incorporated herein by reference.

BACKGROUND OF THE INVENTION

1. Field of the Invention

An aspect of the present invention relates to a supported catalyst for a fuel cell, a method of preparing the same, an electrode for a fuel cell including the supported catalyst, and a fuel cell including the electrode, and more particularly, to a supported catalyst for a fuel cell using a graphite based catalyst carrier to increase durability of the fuel cell, wherein the supported catalyst for the fuel cell achieves superior energy density and fuel efficiency by minimizing the loss of a metal catalyst impregnated in the graphite based catalyst carrier and by regulating the amount of the impregnated metal catalyst, a method of preparing the same, an electrode for a fuel cell including the supported catalyst, and a fuel cell including the electrode.

2. Description of the Related Art

Fuel cells can be classified into polymer electrolyte membrane fuel cells (PEMFCs), phosphoric acid fuel cells (PAFCs), molten carbonate fuel cells (MCFCs), solid oxide fuel cells (SOFCs), etc., according to the kind of electrolyte used in the fuel cells. The operating temperature of fuel cells and constituent materials of the fuel cells vary according to the type of electrolyte used.

According to the method of supplying fuel to the anode, fuel cells can be classified into an external reformer type where fuel is supplied to the anode after being converted into hydrogen-rich gas by an external reformer and an internal reformer type or direct fuel supply type where fuel in gaseous or liquid state is directly supplied to the anode.

A representative example of a direct fuel supply type fuel cell is a direct methanol fuel cell (DMFC). DMFCs use aqueous methanol solution as fuel, and a proton exchange polymer membrane with ionic conductivity as an electrolyte. DMFCs are small and lightweight but can achieve a high output density. In addition, an energy generating system having a simple structure can be manufactured using PEMFCs.

A basic structure of a PEMFC includes an anode (fuel electrode), a cathode (oxidant electrode), and a polymer electrolyte membrane disposed between the anode and the cathode. A catalyst layer for facilitating the oxidation of fuel is formed on the anode of the PEMFC, and a catalyst layer for facilitating the reduction of an oxidant is formed on the cathode of the PEMFC.

In the anode of the PEMFC, proton ions and electrons are generated as a result of the oxidation of fuel. The proton ions migrate to the cathode through the polymer electrolyte membrane, and the electrons migrate to an external circuit (load) through a wire (or a current collector). In the cathode of the PEMFC, the proton ions transmitted through the polymer electrolyte membrane and the electrons transmitted from the external circuit through a wire (or a current collector) combine with oxygen, thereby generating water. Here, the migration of electrons via the anode, external circuit, and cathode produces an electric current. As described, the cathode and/or the anode contain a catalyst which can accelerate electrochemical oxidation of fuel and/or electrochemical reduction of oxygen.

Conventionally, PEMFCs use platinum particles dispersed in an amorphous carbon carrier as catalysts for a cathode and an anode, whereas DMFCs use PtRu as a catalyst for an anode and platinum particles themselves or platinum particles dispersed in a carbon carrier as a catalyst for a cathode.

Figure 3:
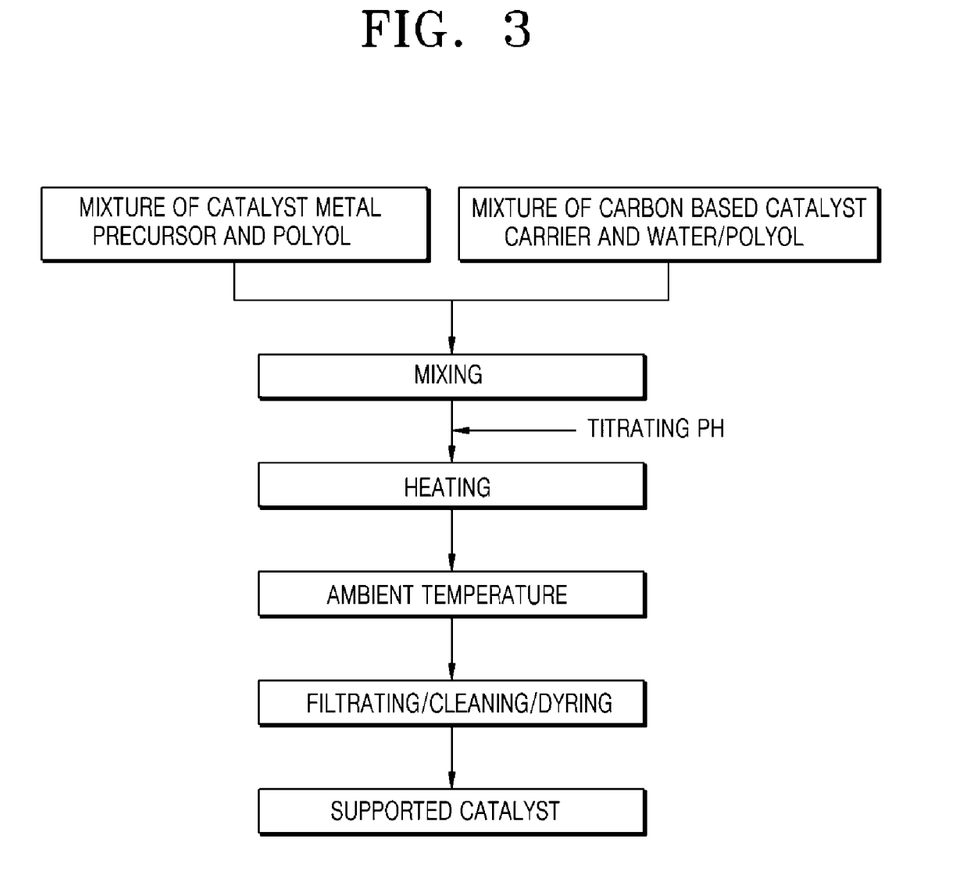
FIG. 3 is a schematic flowchart illustrating a conventional method of preparing a supported catalyst.

U.S. Pat. No. 6,306,543 and U.S. Pat. No. 6,551,960 disclose a method of preparing a supported catalyst wherein platinum particles are dispersed in a carbon carrier using a polyol process. FIG. 3 is a schematic flowchart illustrating a method of preparing a supported catalyst according to a conventional method. Referring to FIG. 3, the method of preparing a supported catalyst, wherein platinum is impregnated in a carbon based catalyst carrier, includes mixing a platinum precursor solution and a dispersed solution of a carbon carrier; titrating the pH of the mixture; heating and cooling the mixture; and filtrating, cleaning and drying the resultant mixture.

The conventional supported catalyst uses a graphite based catalyst carrier, which can easily withstand heat, to prevent the loss of platinum, as a catalyst metal, for an increase in the durability of a fuel cell. However, such a supported catalyst cannot contain a certain amount of the metal catalyst, for example, about 40 wt % or more.

SUMMARY OF THE INVENTION

An aspect of the present invention provides a supported catalyst for a fuel cell using a graphite based catalyst carrier to increase durability of the fuel cell, wherein the supported catalyst for a fuel cell has superior energy density and fuel efficiency by minimizing the loss of a metal catalyst impregnated in the graphite based catalyst carrier and regulating the amount of the impregnated metal catalyst, a method of preparing the same, an electrode for a fuel cell including the supported catalyst, and a fuel cell including the electrode.

According to an aspect of the present invention, there is provided a supported catalyst for a fuel cell, including: a graphite based catalyst carrier; a first catalyst metal particle adsorbed on the surface of the graphite based catalyst carrier, wherein the amount of the first catalyst metal particle is at least 30 wt % based on the supported catalyst; and a second catalyst metal particle impregnated on the surface of the first catalyst metal particle.

According to another aspect of the present invention, there is provided a method of preparing a supported catalyst for a fuel cell, including: preparing a first catalyst metal precursor solution by mixing a first catalyst metal precursor and polyol; preparing a graphite based catalyst carrier solution by mixing a graphite based catalyst carrier, polyol, and water; mixing the first catalyst metal precursor solution and the graphite based catalyst carrier solution; titrating the pH of the mixture of the first catalyst metal precursor solution and the graphite based catalyst carrier solution, and then heating and cooling the mixture of the first catalyst metal precursor solution and the graphite based catalyst carrier solution; preparing a second catalyst metal precursor solution by mixing a second catalyst metal precursor and polyol; adding the second catalyst metal precursor solution to the mixture of the first catalyst metal precursor solution and the graphite based catalyst carrier solution, titrating the pH of the mixture, and then heating and cooling the resulting mixture; and filtrating, cleaning, and drying the resulting mixture.

According to another aspect of the present invention, there is provided an electrode for a fuel cell including the supported catalyst for a fuel cell described above.

According to another aspect of the present invention, there is provided a fuel cell including the electrode for a fuel cell described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to an embodiment of the present invention, a supported catalyst for a fuel cell includes: a graphite based catalyst carrier; a first catalyst metal particle adsorbed on the surface of the graphite based catalyst carrier, wherein the amount of the first catalyst metal particle is at least 30 wt % based on the supported catalyst; and a second catalyst metal particle impregnated on the surface of the first catalyst metal particle.

While preparing a supported catalyst for a fuel cell, increasing the amount of a catalyst metal in a solution, increasing the time of synthesis, etc., does not help in maximizing the amount of the catalyst metal that will be impregnated in a graphite based catalyst carrier. However, research shows that by using another catalyst metal besides the graphite based catalyst carrier and the catalyst metal, the amount of the impregnated catalyst metal can be maximized.

Accordingly, the supported catalyst of an embodiment of the present invention includes the second catalyst metal particle fused on the surface of the first catalyst metal particle in the form of dots, in addition to the first catalyst metal particle adsorbed on the surface of the graphite based catalyst carrier, thus the amount of the impregnated first catalyst metal particle can be at least 30 wt % based on the amount of the supported catalyst.

Figure 1:
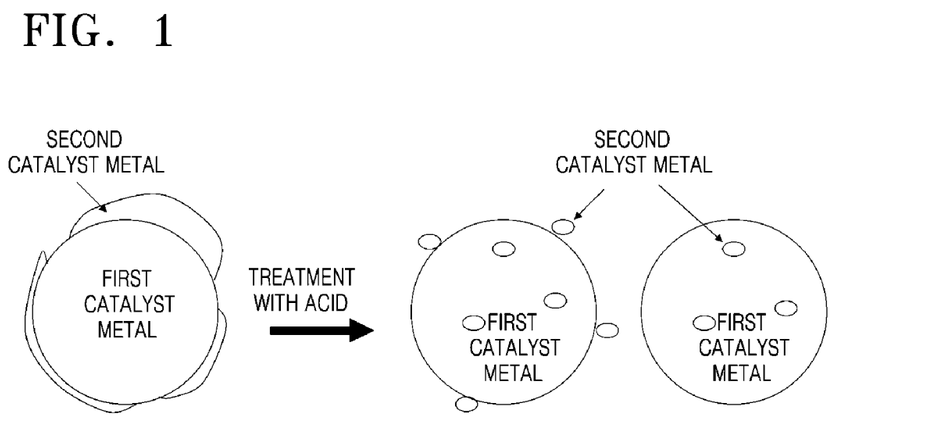
FIG. 1 is a schematic view of a combination of a first catalyst metal particle and a second catalyst metal particle of a supported catalyst according to an embodiment of the present invention.

FIG. 1 is a schematic diagram of combination of the first catalyst metal particle and the second catalyst metal particle of the supported catalyst according to an aspect of the present invention. As illustrated in FIG. 1, during the initial preparation process, the second catalyst metal particle covers most of the surface of the first catalyst metal particle. However, after treatment with an acid, the second catalyst metal particle is impregnated on the surface of the first catalyst metal particle in a form of an island structure or in the form of dots on the surface of the first catalyst metal. Thus, it is clear that the first and second catalyst metal particles in the supported catalyst of an aspect of the present invention have different structures compared to a conventional supported catalyst which has an alloy structure.

According to an aspect of the present invention, the island structure refers to a structure in which the second catalyst metal particle covers 0.01 to 50% of the surface area of the first catalyst metal particle.

In such an island structure, the amount of the second catalyst metal particle may be in the range of 0.01 to 10 wt % based on the supported catalyst. When the amount of the second catalyst metal particle is outside the above range, catalyst performance may deteriorate.

Figure 2:
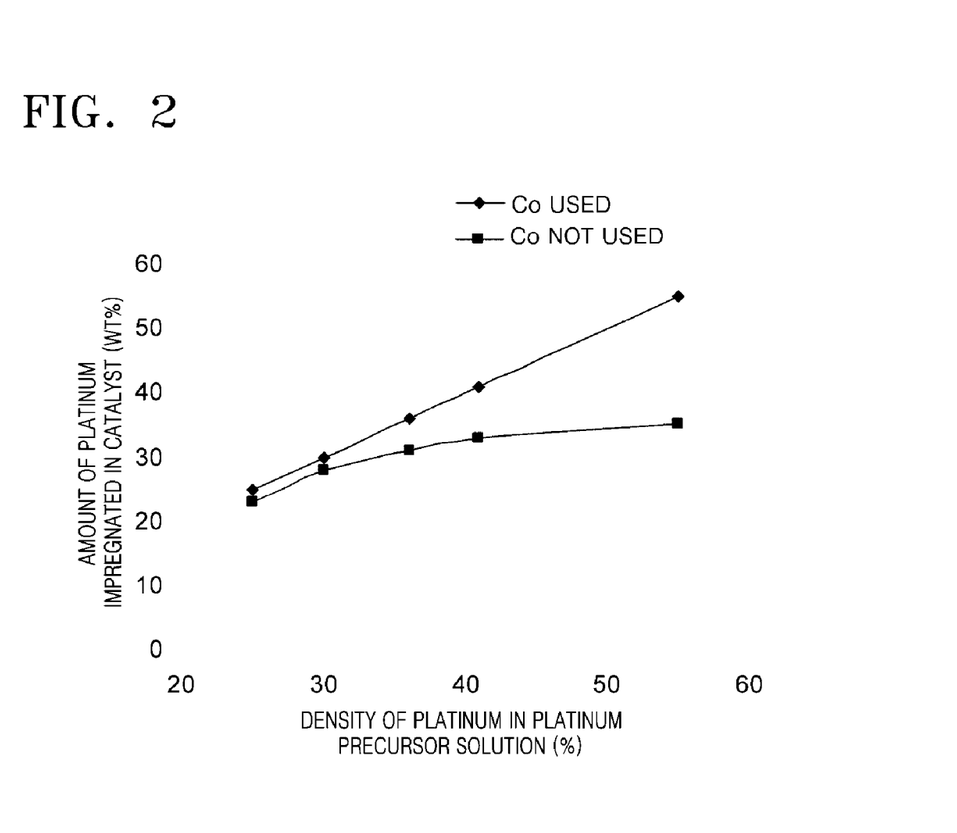
FIG. 2 is a graph illustrating the amount of the impregnated first catalyst metal particle with respect to the amount of the second catalyst metal particle in the supported catalyst illustrated in FIG. 1.

FIG. 2 is a graph illustrating the amount of the impregnated first catalyst metal particle with respect to the amount of the second catalyst metal particle in the supported catalyst according to an aspect of the present invention. In FIG. 2, the first catalyst metal particle is formed of platinum and the second catalyst metal particle is formed of cobalt. Referring to FIG. 2, when cobalt is not used, that is, when the second catalyst metal particle is not used, the amount of platinum impregnated in a catalyst does not increase above a certain level even when the density of platinum in a platinum precursor solution is increased. However, when cobalt is used, the amount of impregnated platinum continuously increases, wherein the platinum is impregnated using a 2-step polyol process which will be explained in detail later. Accordingly, the amount of the impregnated first catalyst metal particle can increase based on the usage of the second catalyst metal particle.

According to an aspect of the present invention, the total amount of the first and second catalyst metal particles may be at least 50 wt % based on the amount of the supported catalyst, and preferably, in the range of 50 to 80 wt % based on the amount of the supported catalyst. Considering that the amount of a catalyst metal particle in a conventional supported catalyst does not exceed 40 wt % based on the amount of the conventional supported catalyst, the total amount of the first and second catalyst metal particles according to an aspect of the present invention is remarkably high.

The first catalyst metal particle, although not limited, may be formed of a metal selected from the group consisting of platinum, gold, ruthenium, osmium, palladium, platinum-ruthenium alloy, platinum-osmium alloy, and platinum-palladium alloy. Preferably, the first catalyst metal particle may be formed of platinum.

The second catalyst metal particle, although not limited, may be formed of a metal, as a bivalent transition metal, selected from the group consisting of cobalt, nickel, copper, zinc, vanadium, chrome, manganese, iron, and titanium. Preferably, the second catalyst metal particle may be formed of cobalt.

The average size of the first catalyst metal particle may be 6 nm or smaller, specifically in the range of 2 to 6 nm. The average size of the second catalyst metal particle may be in the range of 2 to 4 nm. When the average size of the first and second catalyst metal particles is greater than the above range, the performance of the supported catalyst may deteriorate. When the average size of the first and second catalyst metal particles is less than the above range, the structure of the supported catalyst may deteriorate.

The decomposition temperature of the supported catalyst according to an aspect of the present invention is in the range of 400 to 600° C., and therefore, the supported catalyst does not decompose easily even at a high temperature.

According to anther aspect of the present invention, there is provided a method of preparing a supported catalyst for a fuel cell, including: preparing a first catalyst metal precursor solution by mixing a first catalyst metal precursor and polyol; preparing a graphite based catalyst carrier solution by mixing a graphite based catalyst carrier, polyol, and water; mixing the first catalyst metal precursor solution and the graphite based catalyst carrier solution; titrating the pH of the mixture of the first catalyst metal precursor solution and the graphite based catalyst carrier solution, and then heating and cooling the mixture of the first catalyst metal precursor solution and the graphite based catalyst carrier solution; preparing a second catalyst metal precursor solution by mixing a second catalyst metal precursor and polyol; adding the second catalyst metal precursor solution to the resulting mixture above, titrating the pH of the resulting mixture, and then heating and cooling the resulting mixture; and filtrating, cleaning, and drying the resulting mixture of above.

Figure 4:
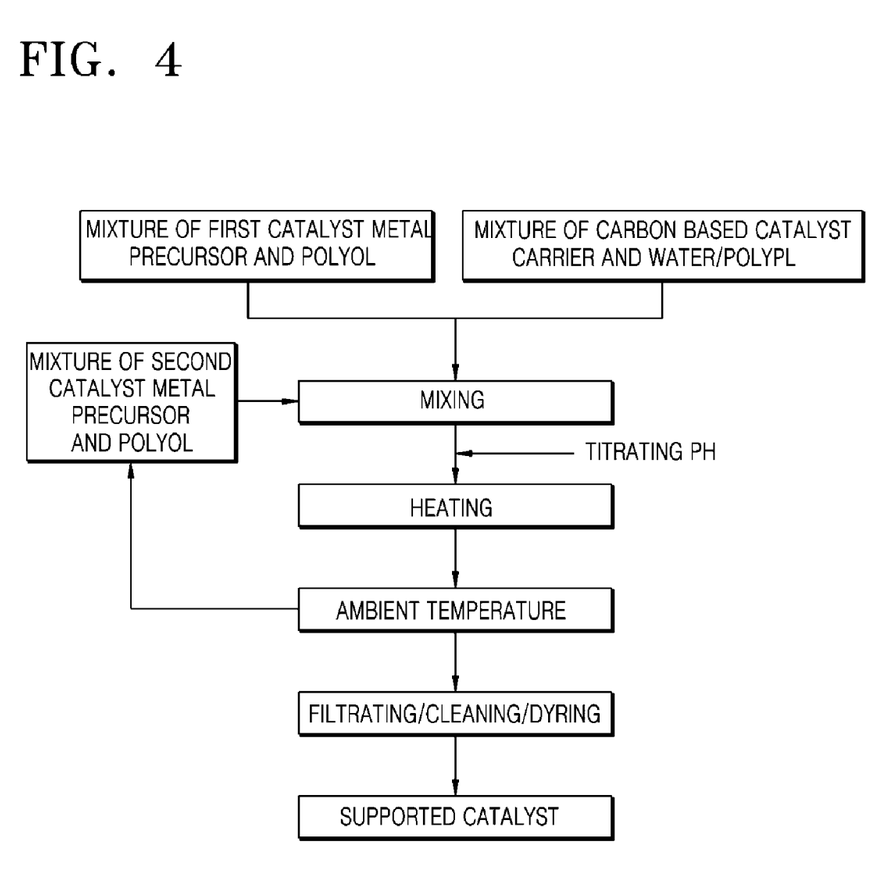
FIG. 4 is a schematic flowchart illustrating a method of preparing a supported catalyst according to an embodiment of the present invention.

FIGS. 3 and 4 are schematic flowcharts illustrating a conventional method of preparing a supported catalyst and the method of preparing the supported catalyst according to an aspect of the present invention respectively.

Referring to FIGS. 3 and 4, the method of preparing the supported catalyst according to an aspect of the present invention uses a 2-step polyol process, unlike the conventional method which uses a 1-step polyol process.

In other words, the conventional method of preparing a supported catalyst uses a 1-step polyol process, which includes: preparing a platinum precursor solution; preparing a graphite based catalyst carrier dispersed solution; mixing the platinum precursor solution and the graphite based catalyst carrier dispersed solution, titrating the pH of the resulting mixture, and then heating and cooling the resulting mixture; and filtrating, cleaning, and drying the resulting mixture.

On the other hand, the method of an aspect of the present invention uses a 2-step polyol process, which includes performing the above-described 1-step polyol process and then mixing the mixture of the first catalyst metal precursor solution and the graphite based catalyst carrier solution with a second catalyst metal precursor solution, and then titrating the pH of the resulting compound, and heating, and cooling the resulting compound.

In the 2-step polyol process, the impregnation of the first and second catalyst metal particles are performed by using a liquid phase catalyst impregnation method using polyol which functions as a reducing agent and a solvent. The details are as follows.

A first catalyst metal precursor is dissolved in polyol to prepare a first catalyst metal precursor solution. The polyol may be ethyleneglycol, diethyleneglycol, triethyleneglycol, etc. The amount of the first catalyst metal precursor may be in the range of 0.2 to 0.8 parts by weight, especially in the range of 0.4 to 0.6 parts by weight based on 100 parts by weight of the amount of the whole reaction solution. Here, the amount of the whole reaction solution is the total amount of the amount of polyol used to dissolve a metal precursor, the amount of polyol used to disperse carbon, and the amount of water. When the amount of the first catalyst metal precursor is less than 0.4 parts by weight, the amount of the whole reaction solution increases, and as a result, a metal catalyst is not formed on carbon but remains in a solution as a colloid particle. When the amount of the first catalyst metal precursor is greater than 0.6 parts by weight, the amount of solution needed in reducing the first catalyst metal precursor is insufficient, which in turn, increases the catalyst metal particle size.

The amount of polyol may be in the range of $10^5$ to $2*10^5$ parts by weight based on 100 parts by weight of the first catalyst metal precursor. If the amount of polyol is less than $10^5$ parts by weight, the reducing capability of the first catalyst metal precursor decreases, and thus a large catalyst metal particle is formed. When the amount of polyol is greater than $2*10^5$ parts by weight, the reduction capability of the first catalyst metal precursor increases, and thus a plurality of small particles are formed, which generates aggregation of the particles.

Various chemical solutions as the first catalyst metal precursor can be used based on the type of a first catalyst metal needed to be impregnated. For example, when the first catalyst metal precursor is a platinum precursor, tetrachloro platinic acid ($H_2PtCl_4$), hexachloro platinic acid ($H_2PtCl_6$), potassium tetrachloro platinic acid ($K_2PtCl_4$), potassium hexachloro platinic acid ($K_2PtCl_6$), or a mixture thereof can be used. When the first catalyst metal precursor is a ruthenium precursor, $(NH_4)_2[RuCl_6]$, $(NH_4)_2[RuCl_5H_2O]$, etc. can be used. When the first metal precursor is a gold precursor, $H_2[AuCl_4]$, $(NH_4)_2[AuCl_4]$, $H[Au(NO_3)_4]H_2O$, etc. can be used. Also, when an alloy catalyst is impregnated, a precursor compound having a mixing ratio corresponding to the atomic ratio of desired metal can be used.

Besides the preparation of the first catalyst metal precursor solution, a graphite based catalyst carrier solution is prepared by dispersing a graphite based catalyst carrier in a mixture of polyol and water.

The graphite based catalyst carrier, although not specifically limited, may have porosity, surface area of at least 250 $m^2/g$, especially in the range of 500 to 1,200 $m^2/g$, and average particle size in the range of 10 to 300 nm, especially in the range of 20 to 100 nm. If the surface area is below the above range, impregnation capability of the catalyst is insufficient.

Examples of the graphite based catalyst carrier satisfying the above characteristics include carbon black, ketjen black (KB), acetylene black, active carbon powder, carbon molecular sieve, carbon nanotubes, active carbon powder having micro pores, and mesoporous carbon.

In the mixture of polyol and water, the amount of water is in the range of 40 to 60 parts by weight based on 100 parts by weight of the whole reaction solution. When the amount of water is less than 40 parts by weight, the size of metal particles increases due to insufficient water functioning as a buffer agent during reduction. When the amount of water is greater than 60 parts by weight, the relative density of polyol decreases during reduction, which increases the size of metal particles. The hydrophilic property of the graphite based catalyst carrier of an aspect of the present invention may be controlled when required.

Next, the first catalyst metal precursor solution and the graphite based catalyst carrier solution are mixed. The pH of the resulting mixture is titrated in the range of 9 to 13, especially 10 to 11, and then the mixture of the first catalyst metal precursor solution and the graphite based catalyst carrier solution is heated. When the pH of the mixture of the first catalyst metal precursor solution and the graphite based catalyst carrier solution is less than 9, a carrier is not formed because the catalyst metal particle, such as a Pt particle, forms a colloid in the reaction solution. When the pH of the resulting mixture is greater than 13, the catalyst metal particle size becomes bigger because the catalyst metal particles aggregate on carbon.

After the titration of the pH, the mixture of the first catalyst metal precursor solution and the graphite based catalyst carrier solution is heated and cooled. The heating temperature may be in the range of 90 to 115° C., preferably in the range of 105 to 110° C. Also, the temperature may be increased at a rate in the range of 1.5 to 115° C./min, preferably in the range of 2.1 to 2.4° C./min. When the heating temperature is less than 90° C., the reduction of the catalyst metal particle may not be completed. When the heating temperature is greater than 115° C., the reaction solution boils rapidly and thus the size of the catalyst metal particle increases because of insufficient water in the reaction solution. When the rate of temperature increase is less than 1.5° C./min, the catalyst metal particle is formed too slowly, and thus the size of the catalyst metal particle is large. When the rate of temperature increase is greater than 3.5° C./min, the catalyst metal particles formed are too small, thus causing aggregation. Accordingly, the mixture of the first catalyst metal precursor solution and the graphite based catalyst carrier solution is heated under the above described conditions, and then cooled down to ambient temperature, that is, about 25° C.

Meanwhile, in the method of preparing the supported catalyst according to an aspect of the present invention, the above described 1-step polyol process is performed, and then the mixture of the first catalyst metal precursor solution and the graphite based catalyst carrier solution is mixed with a second catalyst metal precursor solution. Here, the second catalyst metal precursor solution is prepared by mixing a second catalyst metal precursor and polyol. Next, the pH of the resulting mixture is titrated, and then the resulting mixture is heated and cooled under the same conditions as above.

That is, the second catalyst metal precursor is dissolved in polyol to prepare the second catalyst metal precursor solution. The polyol may be the same polyol used in preparing the first catalyst metal precursor solution. The amount of the second catalyst metal precursor may be in the range of 0.01 to 0.5 parts by weight based on 100 parts by weight of the polyol. When the amount of the second catalyst metal precursor is less than 0.01 parts by weight, the precursor may not adsorb on the surface of the carrier. When the amount of the second catalyst metal precursor is greater than 0.5 parts by weight, excessive precursor may adsorb on the surface of the carrier, and thus the performance of the catalyst may deteriorate.

The second catalyst metal precursor may be a bivalent transition metal precursor. Examples of the second catalyst metal precursor include Fe, Ni, Pd, Sn, etc.

The second catalyst metal precursor solution is mixed with the mixture of the first catalyst metal precursor solution and the graphite based catalyst carrier solution, and then the pH of the resulting mixture is titrated. Subsequently, the resulting mixture is heated and cooled. During this time, the pH range, heating temperature, rate of temperature increase, and cooling temperature is the same as described above. The pH titration, heating and cooling may be repeated one or more times.

The supported catalyst of an aspect of the present invention can be finally prepared by performing a work-up process, such as filtrating, cleaning, and drying the resulting mixture.

The supported catalyst prepared according to an aspect of the present invention has the island structure. The island structure, as described above, is a structure where the second catalyst metal particle is impregnated on the surface of the first catalyst metal particle like an island or in the form of dots. The second catalyst metal particle covers 0.01 to 50% of the surface area of the first catalyst metal particle. Such a structure can be observed through a transmission electron microscope (TEM).

The supported catalyst according to an aspect of the present invention can be included in an electrode catalyst layer of a fuel cell. Accordingly, another aspect of the present invention provides an electrode for a fuel cell including the supported catalyst described above.

Moreover, the supported catalyst can be used as a catalyst in various chemical reactions, such as hydrogenation, dehydrogenation, coupling, oxidation, isomerization, decarboxylation, hydrocracking, alkylation, etc.

According to another aspect of the present invention, there is provided a fuel cell including the electrode for a fuel cell described above. Hereinafter, a direct methanol fuel cell (DMFC) including the supported catalyst will be described with reference to FIG. 5.

Figure 5:
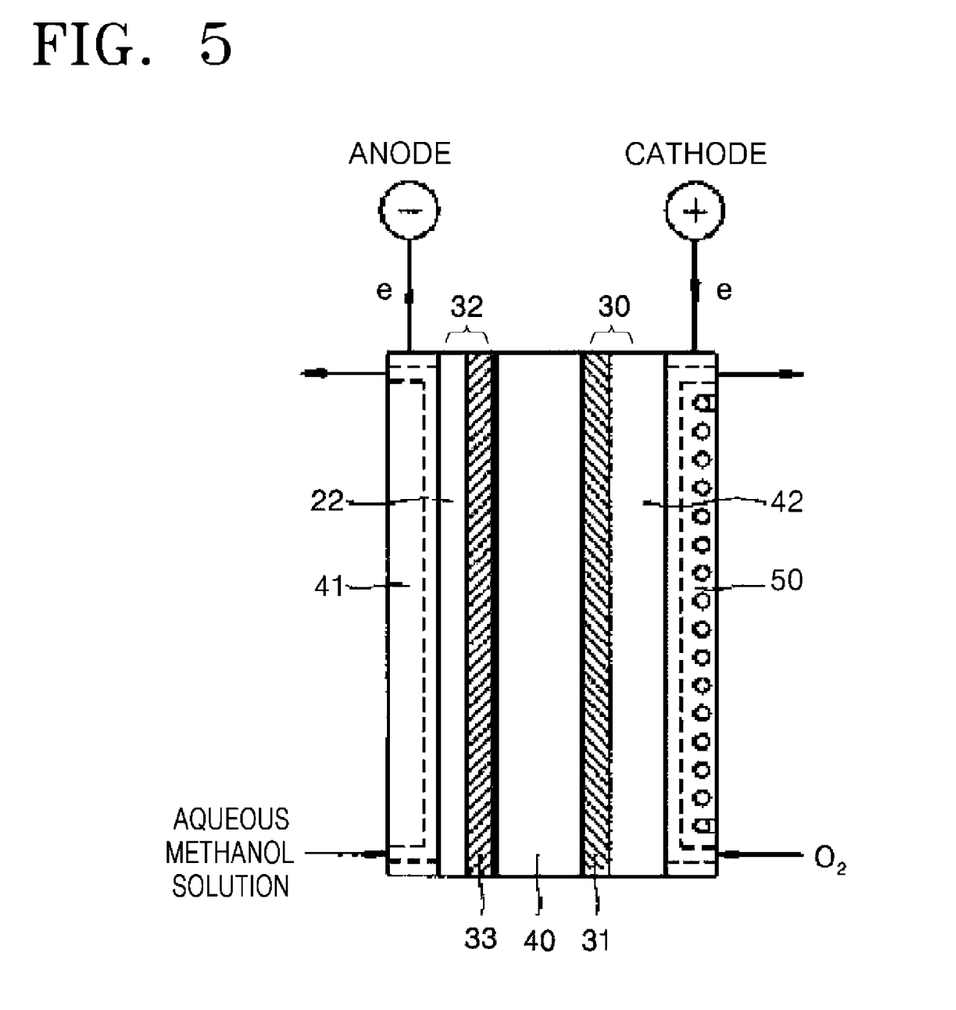
FIG. 5 is a diagram of a fuel cell according to an embodiment of the present invention.

FIG. 5 is a diagram of a direct methanol fuel cell (DMFC) according to an aspect of the present invention Referring to FIG. 5, the DMFC includes an anode 32 which supplies fuel, a cathode 30 which supplies an oxidizer, and an electrolyte membrane 40 disposed between the anode 32 and the cathode 30. Generally, the anode 32 includes an anode diffusion layer 22 and an anode catalyst layer 33, and the cathode 30 includes a cathode diffusion layer 42 and a cathode catalyst layer 31. The anode catalyst layer 33 and the cathode catalyst layer 31 are formed of the supported catalyst described above, according to an aspect of the present invention.

A separator 41 provides a path to supply fuel to the anode 32. Also, the separator 41 functions as an electron transmitter to transmit electrons generated in the anode 32 to an external circuit or a nearby unit cell. Another separator 50 provides a path to supply an oxidizer to the cathode 30. Also, the separator 50 functions as an electron transmitter to transmit electrons supplied from the external circuit or a nearby unit cell to the cathode 30. In the DMFC, an aqueous methanol solution is usually used as the fuel supplied to the anode 32, and air is usually used as the oxidizer supplied to the cathode 30.

The aqueous methanol solution transferred from the anode diffusion layer 22 to the anode catalyst layer 33 is decomposed into electrons, hydrogen ions, carbon dioxide, etc. The hydrogen ions are transferred to the cathode catalyst layer 31 through the electrolyte membrane 40, the electrons are transferred to the external circuit, and carbon dioxide is transferred to the outside. In the cathode catalyst layer 31, the hydrogen ions transferred from the electrolyte membrane 40, the electrons supplied from the external circuit, and oxygen in the air transferred from the cathode diffusion layer 42 react to form water.

In such a DMFC, the electrolyte membrane 40 functions as a hydrogen ion conductor, an electron insulator, a separator membrane, etc. Here, the separator membrane prevents non-reactive fuel from transferring to the cathode 30 or a non-oxidizer from transferring to the anode 32.

The electrolyte membrane 40 may be formed of a positive ion convertibility polymer electrolyte, such as sulfonated high fluoride polymer (for example, Nafion manufactured by DuPont) having a main chain formed of fluorinated alkylene and a side chain formed of fluorinated vinyl ether including a sulfonic acid group at its end.

The present invention will be described in greater detail with reference to the following examples. The following examples are for illustrative purposes only and are not intended to limit the scope of the invention.

Preparation Example 1

0.96 g of a first catalyst metal precursor $H_2PtCl_6 \cdot xH_2O$ (available from Umicore, amount of Pt 39.8 wt %) was dissolved in 2 g of ethyleneglycol to prepare a first catalyst metal precursor solution. 0.25 g of TIMREX HSAG carbon (available from Timcal Co., $S_E$=300 m$^2$/g) was injected in a 125 g mixture of ethyleneglycol and water, that is, 105 g of ethyleneglycol and 20 g of water. The mixed solution was sonicated for 20 min. The first catalyst metal precursor solution and the mixed solution were mixed, and the resulting mixture was stirred for 10 min. Subsequently, the pH of the resulting mixture was titrated to 11 using a 1M KOH solution, and then the resulting mixture was stirred again for 10 min. The temperature of the resulting mixture was increased from ambient temperature (25° C.) to 120° C. for 35 min. at a rate of 2.71° C./min and maintained at 120° C. for 1 hour. Next, the temperature of the resulting mixture was cooled down to ambient temperature, 25° C.

0.2 g of a second catalyst precursor $CoCl_2 \cdot 6H_2O$ (0.1-0.2 g) was mixed with the resulting mixture above. The pH titration, heating and cooling of the resulted compound was repeated. Accordingly, the resulting compound was cleaned 3-4 times using a centrifuge. Then, the resulting compound was dried in a freezing drier to prepare a supported catalyst, i.e., 56 wt % Pt/2 wt % Co/C catalyst having a particle size of 5.6 nm.

Figure 6:
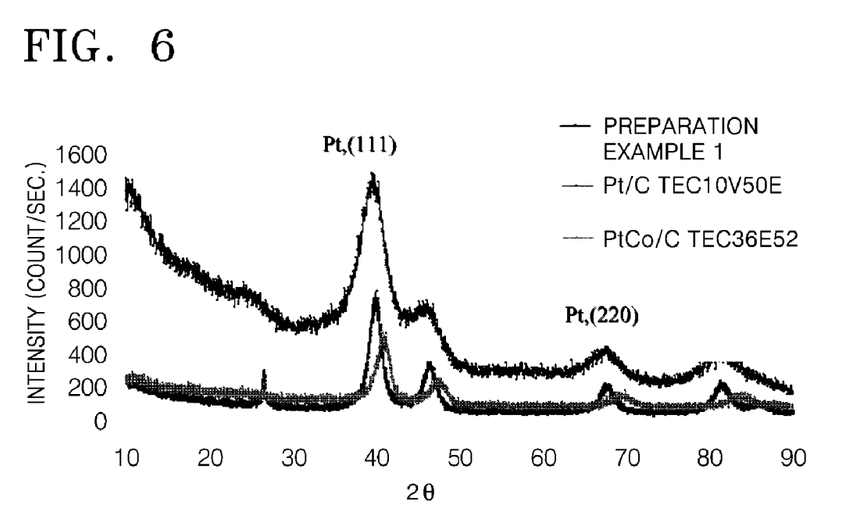
FIG. 6 is a graph illustrating X-ray diffraction analysis data on a supported catalyst prepared in Preparation Example 1 and two kinds of conventional supported catalysts.

FIG. 6 is a graph illustrating X-ray diffraction analysis data on the supported catalyst prepared in Preparation Example 1, Pt/C TEC10V50E, and PtCo/C TEC36E52 (46% Pt 5.2% Co, 5.2 nm) available from TKK. In FIG. 6, 111 and 220 each denotes different crystal planes of a metal. 220 has relatively low peak intensity compared to 111, so particle size can be measured by using a Debye-Scherrer formula using 111. Also, since 111 and 220 are crystal planes of natural platinum, whether the given metal is platinum or not can be confirmed by the location of the peaks.

Figure 7:
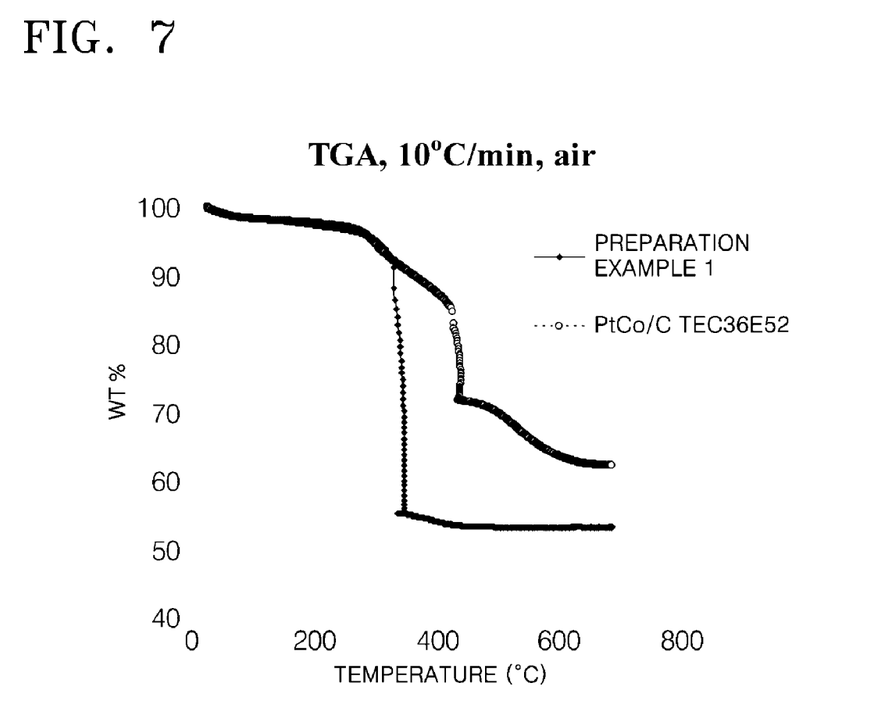
FIG. 7 is a graph illustrating thermal gravimetrical analysis (TGA) data on a supported catalyst prepared in Preparation Example 1 and a conventional supported catalyst.

FIG. 7 is a graph illustrating thermal gravimetrical analysis (TGA) data on the supported catalyst prepared in Preparation Example 1 and PtCo/C TEC36E52 (46% Pt 5.2% Co, 5.2 nm) available from TKK.

Referring to FIG. 7, the supported catalyst prepared in Preparation Example 1 has thermal stability even at a higher temperature than PtCo/C TEC36E52.

Example 1

Preparation of a Fuel Cell

A fuel cell including the catalyst layer obtained by using the supported catalyst in Preparation Example 1 was prepared as follows.

An anode of the fuel cell was prepared by spraying PtRu-black (JM600) at a layer density of 5 mg/cm$^2$ on an anode diffusion layer. A cathode of the fuel cell was prepared by spraying the supported catalyst of Preparation Example 1 at a layer density of 3 mg/cm$^2$ (Pt base) on a cathode diffusion layer. Nafion 115 membrane was used as an electrolyte membrane. The anode, cathode, and the electrolyte membrane were connected at 125° C. by pressing them under the pressure of 5 Mpa to prepare a membrane electrode assembly (MEA). An MEA has a structure where a catalyst layer, a hydrogen ion conductive polymer membrane and an electrode are laminated sequentially. On the anode and the cathode, a separator for a fuel supply and a separator for an oxidizer supply were respectively adhered to prepare the fuel cell.

A supported catalyst for a fuel cell according to an aspect of the present invention uses a graphite based catalyst carrier to increase durability of the fuel cell. Accordingly, a supported catalyst for a fuel cell, having superior energy density and fuel efficiency, can be obtained by minimizing the loss of a metal catalyst impregnated in the graphite based catalyst carrier and regulating the amount of the impregnated metal catalyst. Also, an aspect of the present invention provides a method of preparing the supported catalyst, an electrode including the same, and a fuel cell including the electrode.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A supported catalyst for a fuel cell, comprising:
   a graphite based catalyst carrier;
   first catalyst metal particles adsorbed on the surface of the graphite based catalyst carrier, wherein the amount of the first catalyst metal particles is at least 30 wt % based on the supported catalyst; and
   second catalyst metal particles dotting and impregnating the surfaces of the first catalyst metal particles.

2. The supported catalyst of claim 1, wherein the second catalyst metal particles cover 0.01 to 50% of the surfaces of the first catalyst metal particles.

3. The supported catalyst of claim 1, wherein the amount of the second catalyst metal particles is in a range of 0.01 to 5 wt % based on the supported catalyst.

4. The supported catalyst of claim 1, wherein the amount of the first and second catalyst metal particles is in the range of 50 to 80 wt % based on the supported catalyst.

5. The supported catalyst of claim 1, wherein the first catalyst metal particles are formed of a metal selected from the group consisting of platinum, gold, ruthenium, osmium, palladium, platinum-ruthenium alloy, platinum-osmium alloy, and platinum-palladium alloy.

6. The supported catalyst of claim 1, wherein the second catalyst metal particles are formed of a metal selected from the group consisting of cobalt, nickel, copper, zinc, vanadium, chrome, manganese, iron, and titanium.

7. The supported catalyst of claim 1, wherein:
   the average size of the first catalyst metal particles is in the range of 2 to 6 nm; and
   the average size of the second catalyst metal particles is in the range of 2 to 4 nm.

8. The supported catalyst of claim 1, wherein the decomposition temperature of the supported catalyst is in the range of 400 to 600° C.

9. The supported catalyst of claim 1,
   wherein the surface area of the graphite based catalyst carrier is in the range of 250 to 1,200 m$^2$/g; and
   wherein the average particle size of the graphite based catalyst carrier is in the range of 10 to 300 nm.

10. The supported catalyst of claim 1, wherein the graphite based catalyst carrier is at least one material selected from the group consisting of carbon black, ketjen black (KB), acetylene black, active carbon powder, carbon molecular sieve, carbon nanotubes, active carbon powder having micro pores, and mesoporous carbon.

11. A method of preparing a supported catalyst for a fuel cell, comprising:
- preparing a first catalyst metal precursor solution by mixing a first catalyst metal precursor and polyol;
- preparing a graphite based catalyst carrier solution by mixing a graphite based catalyst carrier, polyol, and water;
- mixing the first catalyst metal precursor solution and the graphite based catalyst carrier solution;
- titrating a pH of the mixture of the first catalyst metal precursor solution and the graphite based catalyst carrier solution, and then heating and cooling the mixture of the first catalyst metal precursor solution and the graphite based catalyst carrier solution;
- preparing a second catalyst metal precursor solution by mixing a second catalyst metal precursor and polyol;
- adding the second catalyst metal precursor solution to the mixture of the first catalyst metal precursor solution and the graphite based catalyst carrier solution, titrating a pH of the resulting mixture, and then heating and cooling the resulting mixture; and
- filtrating, cleaning, and drying the resulting mixture.

12. An electrode for a fuel cell, comprising the supported catalyst of claim 1.

13. A fuel cell, comprising the electrode for a fuel cell of claim 12.

14. The method of claim 11, wherein the second catalyst metal precursor is formed of a material selected from the group consisting of Fe, Ni, Pd, and Sn.

15. The method of claim 11, wherein the adding of the second catalyst metal precursor solution to the mixture of the first catalyst metal precursor solution and the graphite based catalyst carrier solution, the titrating the pH, and the heating and cooling of the resulting mixture are performed at least once.

16. The method of claim 11, wherein the polyol is formed of ethyleneglycol, diethyleneglycol, triethyleneglycol, or a mixture thereof.

17. The method of claim 11, wherein the amount of the first catalyst metal precursor is in the range of 0.2 to 0.8 parts by weight based on 100 parts by weight of the mixture of the first catalyst metal precursor solution and the graphite based catalyst carrier solution.

18. The method of claim 11, wherein the amount of the polyol in the first catalyst metal precursor solution is in the range of $10^5$ to $2*10^5$ parts by weight based on 100 parts by weight of the first catalyst metal precursor.

19. The method of claim 11, wherein the amount of the polyol in the second catalyst metal precursor solution is in the range of $10^5$ to $2*10^5$ parts by weight based on 100 parts by weight of the second catalyst metal precursor.

20. The method of claim 11, wherein the amount of water in the graphite based catalyst carrier solution is in the range of 40 to 60 parts by weight based on 100 parts by weight of the mixture of the first catalyst metal precursor solution and the graphite based catalyst carrier solution.

21. The method of claim 11, wherein the pH of the mixture is titrated in the range of 9 to 13, and the pH of the resulting mixture is titrated in the range of 9 to 13.

22. The method of claim 11, wherein the mixture and the resulting mixture are heated to a temperature in the range of 90 to 115° C.; and wherein the temperature is increased at a rate in the range of 1.5 to 3.5° C./min.

23. The method of claim 11, wherein the amount of the second catalyst metal precursor is in the range of 0.01 to 0.5 parts by weight based on 100 parts by weight of the polyol.

24. A supported catalyst for a fuel cell, comprising:
- a graphite based catalyst carrier;
- acid treated first catalyst metal particles adsorbed on the surface of the graphite based catalyst carrier; and
- acid treated second catalyst metal particles dotting and impregnating the surfaces of the first catalyst metal particles.

25. The supported catalyst according to claim 24, wherein the acid treated second catalyst metal particles cover 0.01 to 50% of the surface of the acid treated first catalyst metal particles.

26. A method of preparing a supported catalyst for a fuel cell, comprising:
- impregnating second catalyst metal particles on first catalyst metal particles using a two-step polyol process, wherein the second catalyst metal particles are impregnated on a surface of the first catalyst metal particles in form of dots.

27. The method of claim 26, wherein the first-step polyol process includes:
- preparing a platinum precursor solution;
- preparing a graphite based catalyst carrier dispersed solution;
- mixing the platinum precursor solution and the graphite based catalyst carrier dispersed solution, titrating the pH of the resulting mixture, and heating and cooling the resulting mixture; and
- filtrating, cleaning, and drying the resulting mixture.

28. The method of claim 27, wherein the second-step polyol process includes:
- mixing the resulting mixture with a second catalyst metal precursor solution forming a resulting compound, and titrating the pH of the resulting compound, and heating, and cooling the resulting compound.

* * * * *